United States Patent
Amo et al.

[15] 3,692,894
[45] Sept. 19, 1972

[54] DENTIFRICE COMPOSITION

[72] Inventors: Tadashi Amo, Funabashi; Tuneo Nagasawa, Tokyo, both of Japan

[73] Assignee: Kao Soap Company, Ltd., Tokyo, Japan

[22] Filed: Nov. 18, 1970

[21] Appl. No.: 90,720

[30] Foreign Application Priority Data

March 31, 1970 Japan ..................... 45/26505

[52] U.S. Cl. ............................................... 424/56
[51] Int. Cl. ............................................. A61r 7/16
[58] Field of Search ........................... 424/49–58, 56

[56] References Cited

UNITED STATES PATENTS 2,812,284   11/1957   Sanders ..................... 424/56

Primary Examiner—Richard L. Ruff
Attorney—Woodhams, Blanchard and Flynn

[57] ABSTRACT

The invention relates to a surfactant-containing dentifrice powder or paste having improved after-taste characteristics containing a polishing agent and from 0.7 to 2.8 percent by weight of a combination of alkyl sulfates constituting 0.2 to 1.0 percent decyl sulfate, 0 to 0.3 percent dodecyl sulfate, 0.2 to 0.5 percent tetradecyl sulfate and 0.1 to 1.0 percent of hexadecyl sulfate, said alkyl sulfates being present as alkali metal salts or alkanolamine salts.

3 Claims, 1 Drawing Figure

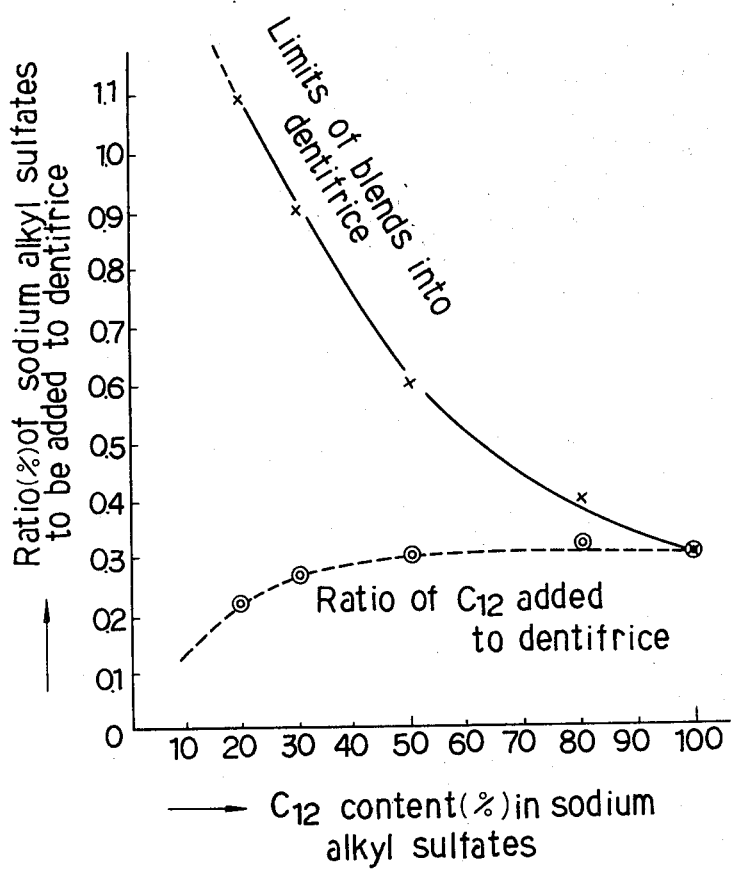

DENTIFRICE COMPOSITION

BACKGROUND OF THE INVENTION

1. Field of the Invention

The invention relates to a dentifrice composition, particularly a tooth paste or powder containing alkyl sulfate surfactants, which composition has all the advantages of such prior pastes and powders, such as satisfactory cleaning and foaming characteristics, but which does not adversely affect the taste of food or have an undesirable taste, itself.

2. Description of the Prior Art

In general, such dentifrices are used after arising in the morning, after taking a meal, or before going to bed, and the purpose is to remove foreign particles from the teeth and to keep them clean, as well as to acquire a refreshing oral feel.

Because dentifrices are often used within a very short time before or after a meal, the effect of the dentifrice on the taste of food and drinks is important. In this respect, conventional dentifrices are known to adversely affect such tastes, causing bitterness and astringency. Though not apparently interfering with the cleaning or polishing function of the dentifrice, the generation of these undesired tastes in connection with food and drink is disadvantageous.

According to our discovery, the alteration of tastes of food and drinks taken shortly before or after using a dentifrice is caused principally by the presence of a surface active ingredient, whereas the presence of polishing agents, wetting agents, sweeteners or perfumes do not alter such tastes.

The commonly used surface active agents, for example, the dodecyl sulfates, have excellent surface active and foaming properties and are inexpensive. However, we have found that the various surface active alkyl sulfate salts or sulfonate salts have a definite effect, changing the tastes of food and drink, and the greatest adverse effect is found in the case of the alkyl sulfates. This is true, even though the surface active carboxylates, the surface active phosphate salts and the nonionic surfactants do not have such a property of taste-alteration. But these latter surface active agents, themselves have an undesirable bitter taste, and/or an oily odor, and/or foam poorly, when incorporated in a dentifrice. Moreover, it is true, even though closely related sulfates and sulfonates, such as sodium p-toluenesulfonate, sodium m-xylenesulfonate or sodium sulfate, do not change the tastes of food and drinks.

The food tastes most adversely affected by the alkyl sulfates are those of beer, cider, tea, miso (or bean paste), soup, fruits and fruit juices, which tend to be bitter and strongly astringent. Starch and protein foods such as boiled rice and meats do not appear to be adversely affected to such a degree.

SUMMARY OF THE INVENTION

Based on the above-mentioned discoveries, we have further discovered that many long-chain alkyl sulfates in the form of their sodium or alkanolamine salts, such as the ethanolamine salts, do not possess this undesired property, or possess it to a reduced degree compared with dodecyl sulfate. Experiments with dentifrice paste compositions which will be detailed below have led to the discovery of a combination of such alkyl sulfates within the range of eight to 18 carbon atoms which lend satisfactory cleaning and foaming properties to the dentifrice paste without causing the adverse taste-effects.

The present invention thus provides an excellent dentifrice composition which does not change the tastes of food and drinks, and which has good cleaning and foaming properties, being an unobvious combination of alkyl sulfates having alkyl groups with 10 to 16 carbon atoms, said alkyl sulfates being incorporated in said composition in the following proportions:

| Alkyl sulfates | Amounts added to the dentifrice composition |
| --- | --- |
| $C_{10}$ | 0.2 – 1.0% (by weight) |
| $C_{12}$ | 0.3% or less |
| $C_{14}$ | 0.2 – 0.5% |
| $C_{16}$ | 0.1 – 1.0% |
| $C_{10} - C_{16}$ | 0.7 – 2.8% |

The alkyl sulfates used as the foaming agents in the present invention include alkali metal salts such as sodium and potassium salts and alkanolamine salts, such as monoethanolamine, diethanolamine or triethanolamine salts.

Any suitable substantially water-insoluble polishing agent can be used, such as are known in the art. Preferred for convenience are calcium carbonate, dicalcium phosphate, tricalcium phosphate, insoluble sodium metaphosphate, calcium pyrophosphate, calcium sulfate, natural substances such as bentonite and mixtures thereof. The water-insoluble phosphate salts are preferred, such as dicalcium phosphate dihydrate or insoluble sodium metaphosphate. The polishing agent will be about 20–75 percent by weight of the paste composition and from 50 percent up to 97 percent by weight or more of the powder composition.

The creaminess of the dentifrice paste can be controlled by liquid additives which are known, such as water, glycerine, aqueous solutions of sorbitol, mannitol, glycols such as propylene glycol, including mixtures thereof. The substances such as glycerine, mannitol and sorbitol function as excipients or humectants, and the total liquid will preferably be an aqueous solution of excipient and comprising 20–75 percent by weight of the paste.

Suitable sweetening and flavoring materials can be used including the oils such as peppermint, clove, eucalyptus, cinnamon, lemon, sucrose, lactose, sorbitol, and saccharine.

The compositions can also contain fluorine-containing ingredients, if desired, such as those known in the art, for example sodium fluoride, stannous fluoride, sodium or potassium stannous fluoride, or the like. Modifiers such as the thickening agents known in the art can also be used in the paste, for example gums such as carboxymethylcellulose, tragacanth, guar, and the like.

The invention will now be described by the following illustrative examples.

EXAMPLE 1

Sodium alkyl sulfates having chains consisting of six to 18 carbon atoms were incorporated into an otherwise conventional tooth paste formulation, each using the same ingredients, except that the sodium alkyl sulfate was varied as discussed below. The influences of the resulting dentifrice compositions on the tastes of food and drinks and the relation between the limits of such influences and the ratios of these alkyl sulfates in the dentifrice compositions were thus demonstrated.

Orange was used as the food which is readily available and is one of the most prone to be adversely affected in taste. The influences of tooth pastes containing 2 percent (by weight, calculated as the active component) of each of the sodium alkyl sulfates of the above-mentioned specific chain lengths on the taste of oranges were examined, and the following results were obtained.

TABLE 1

| Carbon Chain length of the sodium alkyl sulfates | 6 | 8 | 10 | 12 | 14 | 16 | 18 |
|---|---|---|---|---|---|---|---|
| Changes in the taste of oranges* | 0 | 0 | 1 | 5 | 3 | 2 | 0 |

* The rating was made on a scale of from 0 to 5 as follows:
0: No change in the taste inherent to orange
1: The inherent taste of orange does not change, but there are slight bitterness and astringency
2: The inherent taste of orange does not change, but there are some appreciable bitterness and astringency
3: The inherent taste of orange changed, with strong bitterness and astringency
4: The taste of orange disappears, and bitterness and astringency are very strong
5: Bitterness and astringency become greater, and it is unendurable to hold the orange in the mouth

EXAMPLE 2

As is seen from Example 1, sodium alkyl sulfates affect the tastes of food and drinks to varying degrees according to their carbon chain length. Sodium alkyl sulfates of different carbon chain lengths were blended with the following dentifrice components, and the limits of the blending ratios which did not change the tastes of oranges were determined in the same way as in Example 1. The results are shown in Table 2 and FIG. 1, which is a graphic representation showing the limits of the blending ratios of sodium lauryl sulfate in the dentifrice.

Formulation of Tooth Paste

| Calcium hydrogen phosphate dihydrate | 50% by weight |
|---|---|
| Glycerine | 15 |
| Aqueous 70% sorbital | 10 |
| Carboxymethyl cellulose | 1 |
| Sodium benzoate | 0.2 |
| Saccharin | 0.1 |
| Perfume | 0.8 |
| Sodium alkyl sulfates | as indicated in Table 2 |
| Water | remainder |

TABLE 2

| Run No. | Proportions of sodium alkyl sulfates | | | | Limits of proportions in dentifrice | Proportions of sodium alkyl sulfates of $C_{12}$, $C_{14}$ at the limit in the left column | | |
|---|---|---|---|---|---|---|---|---|
| | $C_{10}$ | $C_{12}$ | $C_{14}$ | $C_{16}$ | % | $C_{12}$ | $C_{14}$ | $C_{16}$ |
| 1 | 100 | — | — | — | 2.0 and more | — | — | — |
| 2 | — | 100 | — | — | 0.3 | 0.3 | — | — |
| 3 | — | — | 100 | — | 0.6 | — | 0.6 | — |
| 4 | — | — | — | 100 | 1.0 | — | — | 1.0 |
| 5 | — | 80 | 20 | — | 0.4 | 0.32 | 0.08 | — |
| 6 | — | 50 | 30 | 20 | 0.6 | 0.30 | 0.18 | 0.12 |
| 7 | 20 | 30 | 30 | 20 | 0.9 | 0.27 | 0.27 | 0.18 |
| 8 | 10 | 20 | 40 | 30 | 1.1 | 0.22 | 0.44 | 0.33 |
| 9 | 10 | — | 80 | 10 | 0.7 | — | 0.56 | 0.07 |
| 10 | 30 | 10 | — | 60 | 1.0 | — | 0.60 | 0.30 |
| 11 | 40 | 20 | — | 40 | 1.5 | — | 0.60 | 0.30 |

It is seen from the results indicated in Tables 1 and 2 that sodium lauryl sulfate having 12 carbon atoms affects the taste of food and drinks most greatly and sodium alkyl sulfates of larger or smaller numbers of carbon atoms affect the taste to a progressively lesser degree.

The results of Table 2 are plotted in FIG. 1. It is seen from FIG. 1 that when sodium alkyl sulfates having different carbon chain lengths are added to a dentifrice composition, a dentifrice composition having incorporated therein sodium lauryl sulfate (having 12 carbon atoms) exerts a maximum influence, and the other sodium alkyl sulfates affect the tastes of food and drinks to a lesser degree.

EXAMPLE 3

The purpose of adding a surface active agent to a dentifrice is to facilitate the foaming of the dentifrice in the mouth and thereby remove dirt and soften the sense of touch of the dentifrice. For actual uses, therefore, the surface active agent must foam well in the mouth. In the present Example, the foaming of dentifrice compositions containing the sodium alkyl sulfates of different carbon chain lengths shown in Table 2 was examined by a testing panel and the results are shown in Table 3.

The testing panel consisted of 35 to 38 persons, and the rating was made after each person used about 2 g of the dentifrice composition.

TABLE 3

| Run No. | Dentifrice compositions | Proportion in dentifrice composition(%) | Rating on the foaming in the mouth | | | |
|---|---|---|---|---|---|---|
| | | | very satisfactory (persons) | Satisfactory (persons) | un-satisfactory (persons) | total (persons) |
| 12 | No. 2 of Table 2 | 0.3 | 0 | 4 | 34 | 38 |
| 13 | No. 5 Table 2 | 0.4 | 0 | 6 | 31 | 37 |
| 14 | No. 6 Table 2 | 0.6 | 2 | 6 | 29 | 37 |
| 15 | No. 7 Table 2 | 0.9 | 16 | 16 | 4 | 36 |
| 16 | No. 8 Table 2 | 1.1 | 16 | 20 | 1 | 37 |
| 17 | No. 9 Table 2 | 0.7 | 9 | 19 | 7 | 35 |
| 18 | No. 10 Table 2 | 1.0 | 18 | 15 | 2 | 35 |
| 19 | No. 11 Table 2 | 1.5 | 22 | 13 | 0 | 35 |

| | | | | |
|---|---|---|---|---|
| 20 Sodium lauryl sulfate | 0.9 | 9 | 15 | 11 | 35 |
| 21 lauryl sulfate | | | | | |

It is seen from the results of Tables 2 and 3 that the dentifrice compositions which provide at least as good foaming in the mouth as the known foaming agent, sodium lauryl sulfate and which do not change the tastes of food and drinks comprises 0.2 to 1.0 percent by weight of decyl (C-10) sulfate, 0.3 percent by weight or less of sodium alkyl ($C_{12}$) sulfate, 0.2–0.5 percent by weight of sodium alkyl ($C_{14}$) sulfate and 0.1–1.0 percent by weight of sodium alkyl ($C_{16}$) sulfate, the total of these sodium alkyl sulfates being at least 0.7 percent based on the weight of the dentifrice composition. For practical uses, it is not necessary to add the foaming agent in an amount of more than 2.8 percent by weight.

Examples 4 to 7 given below illustrate formulations of dentifrice compositions according to the present invention.

EXAMPLE 4

| | |
|---|---|
| Calcium hydrogen phosphate dihydrate | 45.0% by weight |
| Sodium carboxymethylcellulose (CMC) | 1.0 |
| Sorbitol (70% aqueous solution) | 10.0 |
| Glycerine | 15.0 |
| Saccharin | 0.2 |
| Perfume | 0.8 |
| Sodium benzoate | 0.2 |
| Sodium alkyl sulfates ($C_{10}$ 10%, $C_{12}$ 20%, $C_{14}$ 40% and $C_{16}$ 30%) | 1.1 |
| Water to make | 100% |

CMC was dispersed and dissolved in glycerine and sorbitol, and the solution was mixed with a separately prepared solution of saccharin and sodium benzoate in water to make a homogeneous viscous solution, followed by mixing calcium hydrogen phosphate dihydrate. Sodium alkyl sulfates and perfume were finally added, and all of these materials were mixed vigorously. The mixture was then deaerated to form a uniform dentifrice paste.

EXAMPLE 5

A dentifrice composition was prepared from the same components as those used in Example 4 except that sodium alkyl sulfates consisting of 50% $C_{10}$, 30% $C_{14}$ and 20% $C_{16}$ (all percentages being by weight) were incorporated in an amount of 1.5 percent by weight based on the weight of the dentifrice composition obtained.

COMPARATIVE TEST

Using the tooth pastes of Examples 4 and 5 and a tooth paste (Comparative Example 1) for comparison which has been prepared by the method of Example 4, using the same components as in Example 4 except 1.5 percent by weight of sodium lauryl sulfate was added instead of the sodium alkyl sulfates, the influences thereof on the taste of oranges were examined.

A panel of about 30 persons ate oranges, and in about 30 minutes brushed their teeth. After a lapse of 5 minutes, they again ate oranges. It was determined subsequently whether the taste of oranges changed before and after tooth brushing. The results are shown in Table 4.

TABLE 4

| Dentifrice | Rating on the changes of the taste of orange | | | | |
|---|---|---|---|---|---|
| | Much changed persons | slightly changed (persons) | Not changed (persons) | Not known (persons) | Total (persons) |
| Ex. 4 | 1 | 2 | 27 | 1 | 32 |
| Ex. 5 | 1 | 1 | 29 | 0 | 31 |
| Comparative Example 1 | 19 | 6 | 3 | 2 | 30 |

EXAMPLE 6

| | |
|---|---|
| Calcium carbonate | 42.0% by weight |
| Calcium hydrogen phosphate dihydrate | 53.0 |
| CMC | 0.3 |
| Saccharin | 0.2 |
| Perfume | 0.5 |
| Triethanolamine alkyl sulfates (mixture of alkyl sulfates consisting of 30% $C_{10}$, 25% $C_{12}$, 35% $C_{14}$, and 10% $C_{16}$) | 1.0 |
| Sorbitol (70% aqueous solution) | 3.0 |

The powdery components were uniformly mixed, and further mixed on addition of small amounts of sorbitol and perfume to obtain a dentifrice powder. The dentifrice powder obtained exhibited a satisfactory foaming in the mouth, and did not change the tastes of food and drinks.

The embodiments of the invention in which an exclusive property or privilege is claimed are defined as follows:

1. A dentifrice composition containing as the active foaming agent, 0.2 to 1.0 percent by weight of decyl sulfate, 0.0 to 0.3 percent by weight of dodecyl sulfate, 0.2 to 0.5 percent by weight of tetradecyl sulfate, and 0.1 to 1.0 percent by weight of hexadecyl sulfate, said alkyl sulfates being alkali metal salts or alkanolamine salts, and the combined amount of the alkyl sulfates being 0.7 to 2.8 percent by weight, all percentages being based on the weight of the dentifrice composition.

2. A dentifrice according to claim 1 wherein the composition is a tooth paste.

3. A dentifrice according to claim 1 wherein the composition is a tooth powder.

* * * * *